(12) United States Patent
Modai et al.

(10) Patent No.: US 8,982,177 B2
(45) Date of Patent: Mar. 17, 2015

(54) SYSTEM AND METHOD FOR WHITEBOARD COLLABORATION

(71) Applicant: Avaya, Inc., Basking Ridge, NJ (US)

(72) Inventors: Ori Modai, Ramat-Hasharon (IL); Yair Wiener, Qiryat Ono (IL); Itai E. Zilbershtein, Hod-Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 100 days.

(21) Appl. No.: 13/936,927

(22) Filed: Jul. 8, 2013

(65) Prior Publication Data

US 2015/0009278 A1    Jan. 8, 2015

(51) Int. Cl.
*H04N 7/15* (2006.01)

(52) U.S. Cl.
CPC ..................... *H04N 7/15* (2013.01)
USPC .............. 348/14.08; 297/135; 348/14.01; 348/14.05; 348/14.09; 348/14.1; 348/14.12; 370/216; 370/260; 434/362; 705/7.12; 705/301; 707/723; 709/204; 709/205; 709/231; 715/733; 715/751; 715/753; 715/757; 719/323

(58) Field of Classification Search
CPC .............. G06Q 10/10; G06F 3/04815; H04M 2201/38; H04N 7/152
USPC .............. 297/135; 348/14.01, 14.05, 14.08, 348/14.09, 14.1, 14.12; 370/216, 260; 434/362; 705/7.12, 301; 707/723; 709/204, 205, 231; 715/733, 751, 753, 715/757; 719/323
See application file for complete search history.

(56) References Cited

U.S. PATENT DOCUMENTS

| | | | |
|---|---|---|---|
| 7,185,054 B1 * | 2/2007 | Ludwig et al. | 709/204 |
| 7,197,751 B2 * | 3/2007 | Fedotov et al. | 719/323 |
| 7,206,811 B2 * | 4/2007 | Skurikhin et al. | 709/205 |
| 7,222,305 B2 * | 5/2007 | Teplov et al. | 715/751 |
| 8,181,115 B2 * | 5/2012 | Irving | 715/753 |
| 8,208,004 B2 * | 6/2012 | Hagendorf et al. | 348/14.09 |
| 8,319,820 B2 * | 11/2012 | Wiener et al. | 348/14.09 |

(Continued)

OTHER PUBLICATIONS

1) Zhang, Zhengyou et al.; "Whiteboard Scanning: Get a High-res Scan With an Inexpensive Camera"; Aug. 12, 2002; Microsoft, Inc.; pp. 1-8; accessed at http://research.microsoft.com/en-us/um/people/zhang/whiteboardscanning/wb%20scanning.pdf; first accessed Feb. 20, 2013.
2) Zhang, Zhengyou et al.; Notetaking with a Camera: Whiteboard Scanning and Image Enhancement; Microsoft, Inc.; 2003; pp. 1-4; accessed at http://citeseerx.ist.psu.edu/viewdoc/downlownload-?doi=10.1.1.145.9527&rep=rep1&type=pdf; first accessed Feb. 20, 2013.

(Continued)

*Primary Examiner* — Gerald Gauthier
(74) *Attorney, Agent, or Firm* — Cochran Freund & Young LLC

(57) ABSTRACT

Disclosed is a method and tool for collaborating in a video conference using a non-electronically enhance whiteboard and without the use of electronically enhanced writing and/or pointing tools. An embodiment may set up a front camera to capture an overall video stream that is split into at least two video feeds, a whiteboard feed and presenter feeds. The front camera may be set up to have a depth of field and focus to capture the whiteboard and presenter as well as specific video capture settings for each feed to optimize the whiteboard or the presenter. An embodiment may capture the two feeds according to the appropriate settings and deliver the two feeds to other video conference member devices. Embodiments may add additional cameras to permit additional optimization such as eliminating whiteboard occluded areas and/or automatically selecting a presenter from a plurality of people who are in the video capture frame.

20 Claims, 5 Drawing Sheets

(56) References Cited

U.S. PATENT DOCUMENTS

| | | | |
|---|---|---|---|
| 8,407,287 B2* | 3/2013 | Wiener et al. | 709/204 |
| 8,483,044 B2* | 7/2013 | Ben-Zedeff et al. | 370/216 |
| 8,830,296 B1* | 9/2014 | Vivekanandan et al. | 348/14.09 |
| 8,837,330 B1* | 9/2014 | Modai et al. | 370/260 |
| 2005/0140184 A1* | 6/2005 | Williams et al. | 297/135 |
| 2007/0046775 A1* | 3/2007 | Ferren et al. | 348/14.08 |
| 2008/0284841 A1* | 11/2008 | Modai et al. | 348/14.1 |
| 2011/0283008 A1* | 11/2011 | Smelyansky | 709/231 |
| 2014/0063176 A1* | 3/2014 | Modai et al. | 348/14.05 |
| 2014/0085399 A1* | 3/2014 | Modai et al. | 348/14.01 |
| 2014/0143672 A1* | 5/2014 | Kim et al. | 715/733 |
| 2014/0327728 A1* | 11/2014 | Modai et al. | 348/14.08 |

OTHER PUBLICATIONS

3) Polycom, Inc. "Polycom Active Touch and UC Board"; 2013, pp. 1-2; accessed at http://www.polycom.com/products-services/hd-telepresence-video-conferencing/realpresence-accessories/realpresence-uc-whiteboard.html; first accessed Feb. 20, 2013; date of paper found at http://citeseerx.ist.psu.edu/viewdoc/summary?doi=10.1.1.145.9527.

4) Cisco; "Enabling Seamless Integration Between a Variety of Interactive Whiteboards and Cisco TelePresence Systems"; Aug. 2012 (Aug. 2013); 1 page; accessed at http://www.cisco.com/en/US/prod/collateral/ps7060/ps11304/ps11314/ps11653/at_a_glance_c78-649514.pdf; first accessed Feb. 20, 2013.

* cited by examiner

SYSTEM AND METHOD FOR WHITEBOARD COLLABORATION

BACKGROUND OF THE INVENTION

Participating in meetings with other people has always been an important part of the business world. As travel technology allowed for faster travel via trains, then automobiles, and then airplanes, it became common for people from remote locations to all gather together for a meeting. A typical meeting might include a presenter at a large board, such as a chalk board, large sheet(s) of paper on a wall or easel, and, more recently, whiteboards. Thus, meeting attendees might see a presenter presenting data at a whiteboard. With progression of technology, it became common to have telephone conferences where people were all on the same telephone line. This permitted people in remote locations to attend meetings without having to take the time or expense to travel to the meeting location. Unfortunately, telephone technology permitted sound only interaction so remote attendees could not see the material presented at a writing board and/or see the expressions or gestures of other meeting attendees. As communication technology progressed, real-time video communication became available and "video conferencing" came into play that permitted remote meeting attendees to view a remote meeting/conference via a live television feed from the remote meeting location.

With particular regard to the writing board used at meetings/conferences, due to the ease of use to write and erase as well as the ease of reading dark lines on a white background, whiteboards have become a common presentation tool. The whiteboard is a simple device, having a white background flat surface that can be written on with whiteboard pens that have an ink that permits easy erasing of the whiteboard after use. While whiteboards may be the most common presentation writing tool, chalk boards (typically having a black surface) and large paper pads are also used. Typically, for cost and ease of use, the writing board tools are simple, non-electronic tools that provide a non-electronically enhanced writing surface written on and/or pointed to using non-electronically enhanced pens and pointing devices (e.g., the presenter's finger or a simple pointing stick).

SUMMARY OF THE INVENTION

An embodiment of the present invention may comprise a method to collaborate in a video conference when a presenter uses a non-electronically enhanced writing surface, referred to herein as a whiteboard, and without using electronically enhanced writing and/or pointing tools, using a front camera that is operatively connected to a video processing-communication unit and is placed in front of the whiteboard in order to capture video of the whiteboard and the presenter using the whiteboard, the video conference collaboration method comprising: setting by the video processing-communication unit a depth of field and a focus for the front camera such that the front camera captures an image of the whiteboard and a predefined distance in front of the whiteboard as a presenter's area; setting by the video processing-communication unit the front camera to capture an overall front camera video stream as at least two video streams, a whiteboard video stream and a presenter video stream such that the whiteboard video stream and the presenter video stream are portions of the overall front camera video stream; setting by the video processing-communication unit whiteboard video capture settings of the whiteboard video stream on the front camera to optimize capture of the whiteboard; setting by the video processing-communication unit presenter video capture settings of the presenter video stream on the front camera to optimize capture of the presenter in the presenter's area in front of the whiteboard; capturing by the video processing-communication unit the whiteboard video stream and the presenter video stream using the front camera according to the depth of field, the focus, the whiteboard video capture settings, and the presenter video capture settings; and delivering by the video processing-communication unit a final conference whiteboard video stream based on the whiteboard video stream and a final conference presenter video stream based on the presenter video stream to member devices of the video conference.

An embodiment of the present invention may further comprise a whiteboard video conference collaboration system comprising: a front camera placed in front of a non-electronically enhanced writing surface, referred to herein as a whiteboard, in order to capture video of the whiteboard and a presenter using the whiteboard; a video processing-communication unit that is operatively connected to the front camera, that sets a depth of field and a focus for the front camera such that the front camera captures an image of the whiteboard and a predefined distance in front of the whiteboard as a presenter's area, that sets the front camera to capture an overall front camera video stream as at least two video streams, a whiteboard video stream and a presenter video stream, such that the whiteboard video stream and the presenter video stream are portions of the overall front camera video stream, that sets whiteboard video capture settings of the whiteboard video stream on the front camera to optimize capture of the whiteboard, that sets presenter video capture settings of the presenter video stream on the front camera to optimize capture of the presenter in the presenter's area in front of the whiteboard, that captures the whiteboard video stream and the presenter video stream using the front camera according to the depth of field, the focus, the whiteboard video capture settings, and the presenter video capture settings, and delivers a final conference whiteboard video stream based on the whiteboard video stream and a final conference presenter video stream based on the presenter video stream to member devices of the video conference.

DETAILED DESCRIPTION OF THE EMBODIMENTS

Figure 1A:
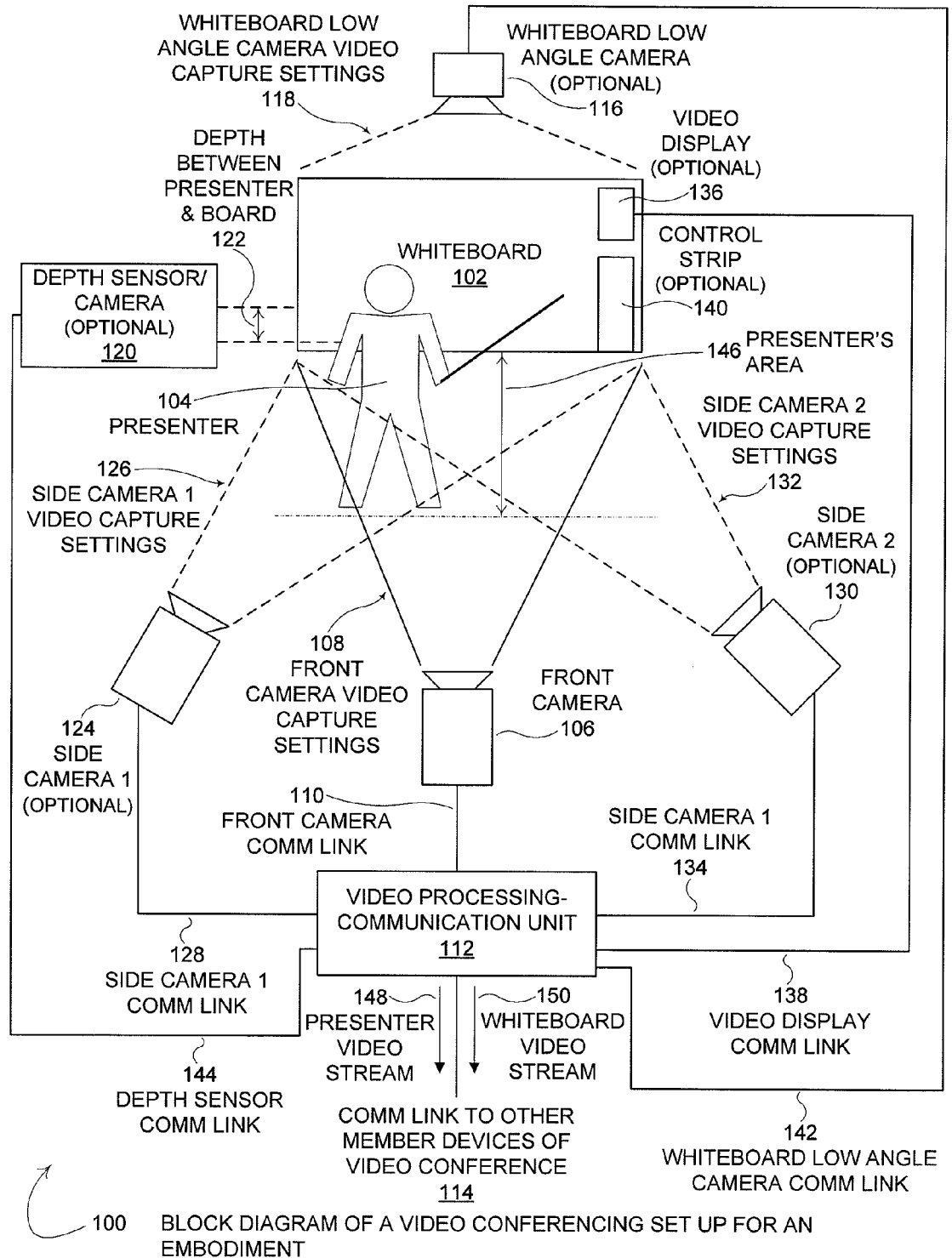
FIG. 1A is a block diagram of a video conferencing set up for an embodiment.

Many organizations provide meeting rooms for on-site, face-to-face collaboration session (i.e., on-site, face-to-face meetings). The meeting rooms are typically equipped with a whiteboard or other presentation scale writing surface like a chalkboard or large paper pad. Typical whiteboard and/or other presentation scale writing surfaces are cheap, non-electronic (i.e., non-interactive) writing surfaces that use non-electronic (i.e., non-interactive) writing pens/pointing devices for writing and/or pointing. For instance, the writing surface does not contain any electronics to interpret or otherwise capture the writing on the writing surface. Likewise, the pen/pointing devices perform the sole purpose of writing (i.e., pen, chalk, etc.) and pointing (i.e., a pointing stick or a person's finger) without any digital data capture capability. Neither the writing surface nor the pen/pointing device contain any electronics to make the writing surface/pen/point device interact (i.e., sense data and/or communicate) with other electronic devices.

Specialized, electronically enhanced equipment may be used to enhance the video conferencing experience. For instance, an electronically enhanced/interactive whiteboard may be used to detect the writing on the whiteboard, and, when combined with dedicated software, may be used to deliver the content drawn/written on the interactive whiteboard. To view the contents of the interactive whiteboard, all participants in the video conference will need to run specialized software to accept and display the information from the interactive whiteboard. Software at the location of the interactive whiteboard is necessary to package the data from the whiteboard for delivery to the other video conference participants. For some video conferencing systems, the whiteboard data provided by the interactive whiteboard may be shared as a data/presentation stream using an International Telecommunication Union (ITU) H.239 standard connection and/or an Internet Engineering Task Force (IETF) Binary Floor Control Protocol (BFCP) connection.

Another approach may be to electronically enhance the pen used to write on the whiteboard (i.e., make an interactive pen). Similar to the interactive whiteboard, the interactive pen interprets what is written/drawn with the pen and sends that information to the other video conference participants. Again, specialized software for the interactive pen is needed interpret the information drawn/written and specialized software for each video conference participant is needed to display the information gathered and sent by the interactive pen.

The use of an interactive pen and/or whiteboard provides an interactive display of the contents drawn/written onto a whiteboard, but requires specialized equipment and software. The specialized equipment and/or software are provided at extra expense and complexity. Further, specialized interactive pens/whiteboards may be proprietary so that users cannot shop for commodity supplies, but must use the sole supplier of the specialized equipment and/or software. Further, the interactive pens and/or whiteboards do not provide a system that delivers both a dedicated whiteboard display as well as a parallel display of the presenter using the whiteboard.

Another system may use unified collaboration software to provide interactive conferencing. The unified collaboration software typically shows the contents of the computer display of the presenter to replace the use of the whiteboard. The unified collaboration software is relatively flexible and reasonable in cost, but does not provide native support for on-site face-to-face collaboration sessions since all of the interaction is done on the computer. Further, during free flowing interaction, it is often easiest for participants to use the tried and true whiteboard/chalk board to facilitate a meeting, particularly for "brainstorming" types of meetings that are not conducive to the more regimented computer keyboard/mouse interface.

For purposes of this document, the term "whiteboard" is intended to be inclusive of not only the standard/typical whiteboard, but also other presentation scale writing surfaces including chalkboards and paper pads. As whiteboards are the most common presentation scale writing surface in the market today, the discussion is more natural and understandable when referring to a "whiteboard" rather than a "writing surface" and it is felt that discussing the concept in terms of a "whiteboard" will be more easily understood by the reader. The concepts presented herein can be applied in the same manner to other writing surfaces such as a chalkboards and/or paper pads. For a chalkboard, the system will use the black/grey surface of the chalkboard as the indication of the background rather than the white surface of a typical whiteboard. Further, optimization of the "whiteboard"/writing surface video capture may include changing background colors of the writing surface to a desired background color, such as changing a chalkboard from white writing on a black surface to black writing on a white surface.

The term presentation as used herein is meant to broadly convey the presentation of any subject matter, no matter how prepared by a presenter (i.e., a person) during a meeting/presentation that is being attended by remote users through video collaboration. A presenter may employ the use of a whiteboard as a tool to convey information. There is no requirement that a presentation entail particular preparation, length of time, or other subject matter restrictions, only that a presenter (i.e., a person) delivers information to other members of a meeting, whether those members are at the same location as the presenter or at remote locations viewing the presenter using video conferencing/video collaboration. For purposes of this document, it is assumed that the presenter uses a whiteboard during at least a portion of a presentation to convey information to other meeting/members/attendees.

Figure 1B:
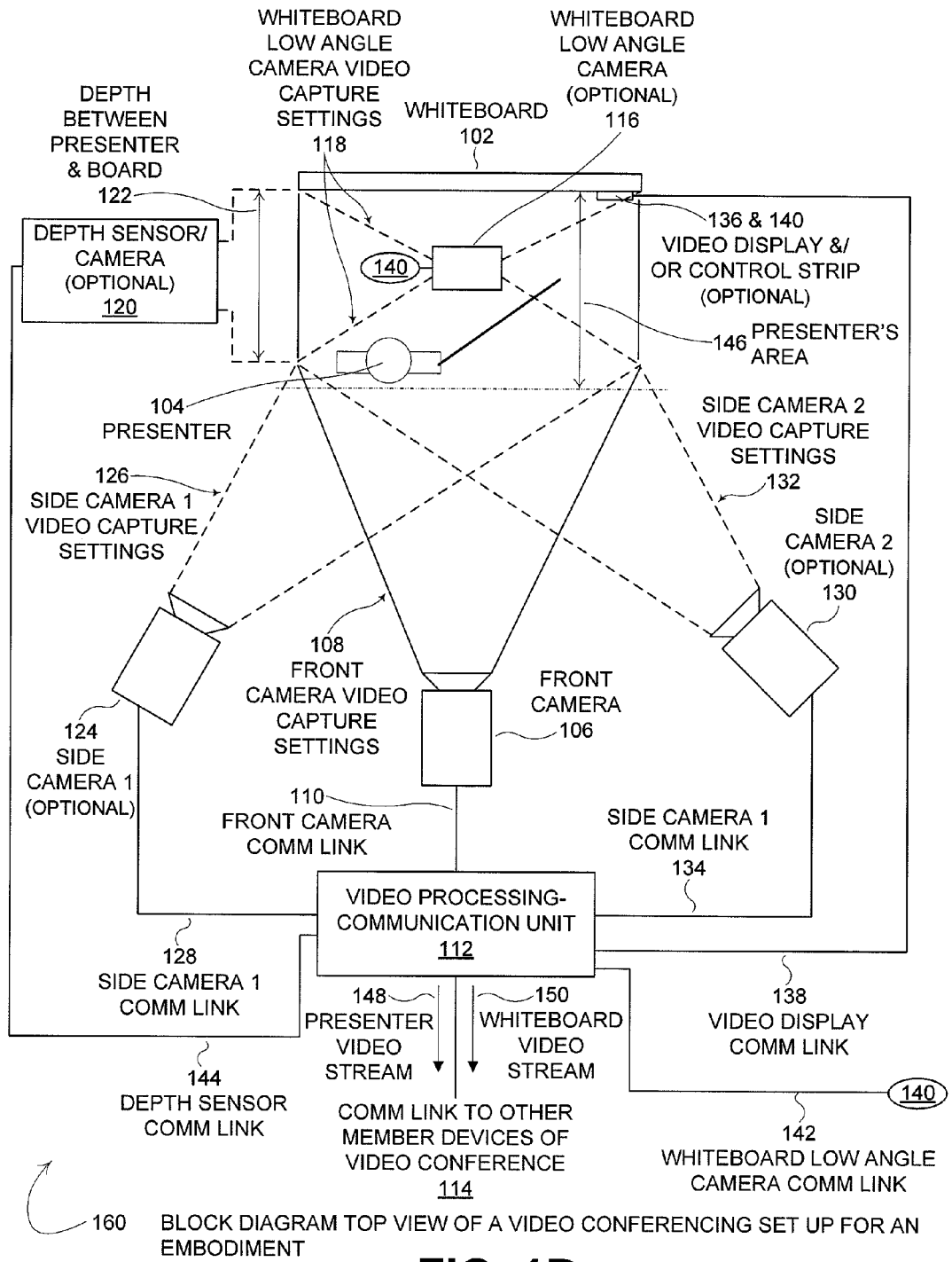
FIG. 1B is a block diagram top view of a video conferencing set up for an embodiment.

FIG. 1A is a block diagram 100 of a video conferencing set up for an embodiment. FIG. 1B is a block diagram 160 top view of a video conferencing set up for the embodiment. In the embodiment of FIGS. 1A & B, a presenter 104 is standing in front of a whiteboard 102, giving a presentation. Front camera 106 captures video (which may also be called a video stream) of the whiteboard 102 and the presenter 104. The front camera 106 is referred to as the front camera 106 since the camera 106 is placed in "front" of the whiteboard 102 and presenter 104 in order to capture video images of the presenter 104 using the whiteboard 102 to give a presentation. The front camera 106 may be a relatively inexpensive digital camera, such as "webcam" cameras commonly available as built in features of laptop computers or very inexpensive peripheral add on devices. While more expensive digital cameras may be used, there is no need to have anything more than a simple "webcam."

The front camera 106 is operatively coupled to a video processing and communication unit 112. The video processing-communication unit 112 may be any single or combination of digital computing devices that contain the logic functions to permit setting focus and/or other video capture characteristics/parameters of the front camera 106, or other cameras (e.g., 116, 124, and/or 130) that may also be operatively connected to the video processing-communication unit 112. The video processing-communication unit 112 provides the communication link (e.g., Internet and/or other networking connection) 114 to other member devices of the subject video conference. The front camera 106 may be a stand-alone camera with the video processing and communication unit 112 built into the camera device such as a self-contained webcam having the video processing and communication (i.e., unit 112) for delivering video streams over Ethernet, wireless networking, TCP/IP (Transmission Control Protocol/Internet Protocol) capable networks, UDP/IP (User/Universal Datagram Protocol/Internet Protocol) capable networks, and/or other electronic communications connections. Similarly, the video processing-control unit 112 may be a laptop computer with an integrated webcam acting as the front camera 106. For a multiple camera option, the additional cameras, such as 116, 124, and 130, may also be integrated with the video processing-communication unit 112 and/or peripheral devices operatively connected to the video processing-communication unit 112, or any combination thereof. Portions of video processing may be performed by digital computing integrated with the cameras (e.g., 106, 116, 124, and/or 130) and/or performed using digital computing located in one or more separate devices. For purposes of this document, the cameras (e.g., 106, 116, 124, and/or 130) are defined as only the camera where the camera is able to accept and operate according to camera settings provided by operatively connected video processing-communication resources 112. Again, for purposes of this document, the video processing-communication unit 112 is defined as the digital computing resources that generates settings for cameras (e.g., 106, 116, 124, and/or 130), analyzes video streams, performs operations on video streams, and/or provides the communication interface to deliver one or more video streams to other video conference member devices 114.

For the embodiment shown in FIGS. 1A & B, the operative connection (i.e., communication link) between the front camera 106 and the video-processing-communication unit 112 is shown as front camera communication link 110. The operative connection (i.e., communication link) between side camera 1 (124) and the video-processing-communication unit 112 is shown as side camera 1 communication link 128. The operative connection (i.e., communication link) between the side camera 2 (130) and the video-processing-communication unit 112 is shown as side camera 2 communication link 134. The operative connection (i.e., communication link) between the whiteboard low angle camera 116 and the video-processing-communication unit 112 is shown as whiteboard low angle camera communication link 142.

As described above, the cameras (i.e., 106, 116, 124, and/or 130) may be internal to the same device as the video processing-communication unit 112 and/or may be peripherally connected to the video processing-communication unit 112. Accordingly, the actual physical connection may be accomplished in the wide variety of electronic communication formats available for either internal communications, or external/peripheral communications. For instance, an internal connection may be accomplished via one or more traces on a circuit board, or even traces shared on an integrated circuit (IC) chip. The communications protocols may be proprietary protocols determined by a particular manufacturer or may be non-proprietary standards such as the Peripheral Component Interconnect Express (PCIe) protocol used on the expansion bus for many personal computers. PCIe also has an external physical interconnect standard that may be used to connect external peripheral cameras to a computer acting as the video processing-communication unit 112. The Universal Serial Bus (USB) is currently a very common peripheral bus protocol that may be used to connect external peripheral devices, but may also be used for internal bus communications. Two common high definition video connection protocols that may be used are HDMI (High-Definition Multimedia Interface) and DVI (Digital Visual Interface). The HDMI protocol includes a sound component in the connection, while the DVI protocol is video only such that a separate sound connection may also be necessary. In some instances, wireless communications connections may act to complete the operative communication link(s) (i.e., 110, 124, 134, and/or 142) between the video processing-communication unit 112 and the camera(s) (106, 116, 124, and/or 130). It is not feasible to attempt to list herein the large variety of communication protocols that may used to operatively connect the cameras (i.e., 106, 116, 124, and/or 130) of an invention to the video processing-communication unit 112. The communication link(s) (i.e., 110, 124, 134, and/or 142) should be capable of transmitting the images captured by the camera(s) (106, 116, 124, and/or 130) to the video processing-communication unit 112.

Likewise, the communication link 114 between the video processing-communication unit and other member devices of the video conference may also be any proprietary and/or non-proprietary communication system desired by a system designer. Typically, some type of UDP/IP connection is the most likely connection, but other networking/electronic communications technologies would work for various embodiments. Again, it is not feasible to attempt to list herein the large variety of communication protocols that may used to operatively connect 114 the video processing-communication unit 112 to other member devices of the video conference. The communication link 114 should be capable of transmitting the appropriate video streams to the other member devices of the video conference.

In the embodiment shown in FIGS. 1A & B, a depth sensor/camera 120 may be optionally included in the overall whiteboard video conference collaboration system. The depth sensor/camera 120 may be used to measure the depth 122 between the presenter 106 and the whiteboard 102. The depth sensor/camera 120 may be operatively connected to the video processing-communication unit 112 via depth sensor communication link 144 in order to deliver the depth 122 measured to the video processing-communication unit 112. As described above for cameras 106, 116, 124, and/or 130, the depth sensor/camera may have all or part of the digital computing ability of the video processing-communication unit 112 contained in the same package as the depth sensor camera 120, or the depth sensor/camera 120 may be incorporated into the system as an external peripheral connection to the video processing-communication unit 112. Accordingly, the actual physical connection may be accomplished in the wide variety of electronic communication formats available for either internal communications, or external/peripheral communications similar to the connections 110, 128, 134, and/or 142 for cameras 106, 116, 124, and/or 130, including internal traces on circuit boards and/or ICs, external wiring, and/or wireless communication connections. Once again, it is not feasible to attempt to list herein the large variety of communication protocols that may used to operatively connect 144 the depth sensor/camera 120 to the video processing-communication unit 112. The depth sensor communication link 144 should be capable of transmitting the appropriate depth 122 information to the video processing-communication unit 112.

The embodiment shown in FIGS. 1A & B also includes an optional video display 136 and optional control strip 140 mounted on or near the whiteboard 102. The video display 136 is intended to permit the presenter 104 to see other video feeds and/or computer displays associated with the current video conference so that the presenter 104 may view the applicable video streams and/or computer programs being used for the subject video conference/meeting. The control strip may be a non-electronically enhanced board with areas detectable by at least one of the video cameras 106, 116, 124, and/or 130. The video processing-communication unit 112 may monitor the video from the cameras 106, 116, 124, and/or 130 to detect the presenter 104 pointing to the detectable areas on the control strip 140. The video processing-communication unit 112 may associate commands with each of the detectable areas on the control strip 140 and perform the associated command when the presenter points at the detectable areas on the control strip 140.

Thus, a whiteboard video conference collaboration system may be comprised of a front camera 106 calibrated to capture the whiteboard 102 and optionally one or more additional cameras 116, 124, and/or 130 that may be used to capture the whiteboard 102 and/or presenter 104 from different angles than the main front camera 106. Additionally, an embodiment may further add a depth sensing camera/depth sensor 120 to sense the depth 122 between the presenter 104 and the whiteboard 102. The video processing-communication unit 112 of an embodiment may provide the digital computing resources to manage and control the cameras/depth sensors (106, 116, 120, 124, and/or 130) as well as to perform analysis and/or optimization operations on video captured by the cameras (106, 116, 124, and/or 130). For an embodiment, the video processing-communication unit 112 may receive the video feeds that are captured by the cameras (106, 116, 124, and/or 130) in a room hosting the whiteboard video conference collaboration system. The video processing-communication unit 112 may generate at least two aggregated optimized video streams to deliver 114 to other member devices of a video conference. An embodiment may generate one or more video streams focused on the presenter 104 (i.e., a presenter video stream 148) and one video stream focused on the whiteboard 102 (i.e., a whiteboard video stream 150). For integration with a typical video conferencing system, the presenter video stream 148 may be shared as the main video stream and the whiteboard video stream 150 may be shared as a data/presentation stream, possibly via a connection set up according to the International Telecommunication Union (ITU) H.239 standard and/or a connection set up according to the Internet Engineering Task Force (IETF) Binary Floor Control Protocol (BFCP). For integration with a unified communication system, the white board video stream 150 may be shared as a web collaboration stream and the presenter video stream 148 may be shared as video coming from the meeting room.

In order to generate the final conference presenter 148 and whiteboard 150 video feeds/streams, the video processing-communication unit 112 may set the camera depth and focus of each available camera (e.g., 106, 116, 124, and/or 130) to capture the whiteboard 102 and a predefined distance in front of the whiteboard (i.e., the presenter's area 146). The video processing-communication unit 112 may set the video cameras (e.g., 106, 116, 124, and/or 130) to capture frames of the video stream of each camera in two capture settings (e.g., exposure, white balance, etc.). One capture setting, a whiteboard video capture setting, may optimize a camera (e.g., 106, 116, 124, and/or 130) for capturing images of the whiteboard 102. The other capture setting, a presenter video capture setting, may optimize a camera (e.g., 106, 116, 124, and/or 130) for capturing images of the presenter 104/presenter's area 146 and/or generally to optimize video capture of the room hosting the whiteboard video conference system in general. The whiteboard and/or presenter video capture settings may be applied to different sets of frames in order to obtain optimal image capture/exposures from a single camera (e.g., 106, 116, 124, and/or 130). For instance, a camera (e.g., 106, 116, 124, and/or 130) capturing images at 30 frames per second (fps) may be set to capture every sixth frame (i.e., $\frac{1}{6}^{th}$ frame) with the whiteboard optimized video capture settings and the remaining frames using the presenter optimized video capture settings such that the whiteboard video stream 150 is presented at 5 fps and the presenter/room video stream 150 is presented at 25 fps. While the ⅙ whiteboard video stream 150 and ⅚ presenter/room video stream 148 has been found to work well, other ratios may also be used as long as there is a portion of the overall video stream for the whiteboard video stream 150 and a portion of the overall video stream for the presenter/room video stream 148. For instance, if a camera captures frames more or less quickly than 30 fps, it may be desirable to adjust the chosen frame rate of the presenter video stream 148 in relation to the whiteboard video stream 150. In the embodiment shown in FIGS. 1A & B, the front camera video capture settings 108 would be the video capture settings adjusted for the front video camera 106 capturing frontal images of the whiteboard and presenter. The side camera 1 video capture settings 126 would be the video capture settings adjusted for the side 1 video camera 124. The side camera 2 video capture settings 132 would be the video capture settings adjusted for the side 2 video camera 130. The whiteboard low angle video capture settings 118 would be the video capture settings adjusted for the whiteboard low angle video camera 116.

In order to select the presenter 104 from other people at the whiteboard 102 location/room, the video processing-communication unit 112 may analyze the presenter/room video feed(s) from the available cameras (e.g., 106, 116, 124, and/or 130). The video processing-communication unit 112 may automatically detect each person at the whiteboard 102 location/room by executing face detection analysis processes. The video processing-communication unit 112 may extend the detected faces of each person to contain the entire available image of the person using edge detection processes. The video processing-communication unit 112 may also estimate the proximity (i.e., depth 122) of the detected persons to the whiteboard 102. The proximity/depth 122 assessment may be performed using the optional depth sensor/camera 120, estimating depth 122 based on stereo (i.e., at least two) camera video feeds (e.g., video feeds from the main front camera 106 and at least one of the side cameras 124, 130 and/or the whiteboard low angle camera 116), and/or by comparing the occluded areas of the whiteboard 102 on two or more video feeds from the available cameras (e.g., 106, 116, 124, and/or 130). A process for estimating proximity/depth 122 of a person based on occluded areas of the whiteboard 102 image may include:
  1) Identifying a specific location/point on the contour of the image of a detected person (e.g., the highest point on the image of the detected person)
  2) Projecting the identified point to the plane of the whiteboard 102
  3) Comparing the projected points from two or more cameras (e.g., 106, 116, 124, and/or 130) and using triangulation to estimate the depth 122

The video processing-communication unit 112 may also analyze the gaze direction for each detected face and gesture direction for each identified person. In order to identify the image of the active presenter 104 from images of multiple people, the video processing-communication unit 112 may evaluate the proximity/depth 122 to the whiteboard 102, gaze direction, persistency as a presenter 104, and/or gesture direction to the whiteboard 102 of each identified person.

Once the active presenter 104 is selected/identified and if there are multiple cameras (e.g., 106, 116, 124, and/or 130), the video processing-communication unit 112 may select the optimal video feed from one of the cameras (e.g., 106, 116, 124, and/or 130) to use as the primary source for the presenter video stream 148 communicated 114 to other video conference member devices. The selection of the camera (e.g., 106, 116, 124, and/or 130) video feed may be based on an evaluation of:

How frontal is the face of the presenter 104?
Is the presenter 104 occluded?
Is the presenter 104 fully captured?
The persistency of the selected video feed with previously used video feeds of the same presenter 104.

The video processing-communication unit 112 may optimize the final conference whiteboard video stream 150 by combining/aggregating the video feed from multiple cameras (e.g., 106, 116, 124, and/or 130) and/or performing processing on a single video feed. For the video feed from each available camera (e.g., 106, 116, 124, and/or 130), the video processing-communication unit 112 may use image processing to transform the whiteboard image to a rectangular shape, even when the video feed is from a camera such as side camera 1 (124) and/or side camera 2 (130) that is capturing the whiteboard 102 image at a distinct angle which would render an un-optimized image of a non-rectangular whiteboard 102 due to the perspective of the camera (e.g., side camera 1 (124) and/or side camera 2 (130)) location. Since the surface of the whiteboard 102 is relatively uniform in color and texture, it is possible to detect the borders of the whiteboard against a background and/or the relative position of the whiteboard 102 in the captured image may be set according to pre-calibration inputs. With the borders of the whiteboard identified, image processing, including affine transform and resizing, may be used to transform and resize the image of the whiteboard 102 to make the image of the whiteboard 102 appear in rectangular form. An affine transformation is geometric transformation which preserves straight lines and ratios of distances between points lying on a straight line. An affine transformation does not necessarily preserver angles or lengths, but does keep parallel lines parallel after transformation. Consequently, an affine transformation permits the removal of the angles provided by the perspective of the camera(s) (e.g., side camera 1 (124) and/or side camera 2 (130)) to form a rectangular whiteboard 102 image, while maintaining the appropriate parallel lines and relative ratios. Transformations other than affine transformations that correct for optic distortion may also be used alone, or in combination, with the affine transformation to optimize the image of the whiteboard.

Other optimizations that may be performed by the video processing-communication unit 112 may adjust the captured image to improve the sharpness and/or color of the image. For instance, the contrast of the video image of the whiteboard 102 may be adjusted to improve the sharpness/contrast of the lines and shapes written/drawn on the whiteboard 102. The color balance of the image may also be adjusted to improve the image by giving the background of the whiteboard 102 an authentic white color. Further, if the whiteboard 102 in fact has a different, non-white background, the background color can be changed to white for easier reading on a computer display, if so desired.

To reduce specular light or reflections, one or more polarized filters may be used at the camera(s) (e.g., 106, 116, 124, and/or 130). Specular light or reflection refers to a mirror-like reflection of light from a single source. In the case of the whiteboard 102, a light used to illuminate the whiteboard 102 may cause a specular reflection due to the typically shiny nature of a whiteboard 102. The orientation of the polarizing filter(s) may be set manually during installation, or the video processing-communication unit 112 may automatically rotate the polarized filter at the camera(s) (e.g., 106, 116, 124, and/or 130) as part of an adjustment of the video capture settings of the camera(s) (e.g., 106, 116, 124, and/or 130) in order to better reduce the specular light or reflections. Also, as discussed in more detail below, it may also be possible to reduce and/or eliminate specular light or reflections by fusion (i.e., combination) of images from multiple camera sources.

Another optimization of the whiteboard video stream 150 may be eliminating occluded (i.e., blocked) areas of the whiteboard 102 from the whiteboard video stream 150. An occlusion may be detected by edge detection of an occluding object relative to the surface of the whiteboard 102. Since the surface of the whiteboard 102 is relatively uniform in color and texture, it is possible to detect the occluded areas as those not having the expected color and/or texture of the whiteboard 102. Also, a temporal filter may be used to segment the whiteboard 102 and any foreground portions of an image. If a depth sensor/camera 120 is included in an embodiment, the depth sensor 120 data may be used, alone or in combination with edge detection, to identify occluded areas of the whiteboard. Similarly, if multiple cameras (e.g., 106, 116, 124, and/or 130) are available, a stereo determination of depth of objects may be used in a similar fashion as the depth sensor 120 data to identify occluded areas. If only a single camera, such as the front camera 106, is available, or all camera (e.g., 106, 116, 124, and/or 130) video feeds have the same occluded area, the video processing-communication unit may complete missing whiteboard 102 areas from previously composed whiteboard video stream 150 frames that were captured in the past. If occluded areas of the whiteboard 102 are available in video feeds from different camera angles (e.g., 106, 116, 124, and/or 130), then the video processing-communication unit 112 may merge or fuse (i.e., aggregate) different video feeds from different cameras (e.g., 106, 116, 124, and/or 130) to complete occluded areas.

Similar to occluded areas of the whiteboard, areas of the whiteboard that are not visible due to specular light or reflections as discussed previously above, or any type of reflection for that matter, may be compensated for in the same manner as for the occluded areas. That is, an area of the whiteboard 102 image missing due to a reflection may be detected by edge detection of the reflection relative to the surface of the whiteboard 102. Since the surface of the whiteboard 102 is relatively uniform in color and texture, it is possible to detect the reflection as an area not having the expected color and/or texture of the whiteboard 102, such as an unexpected bright spot on the whiteboard 102 image. If only a single camera, such as the front camera 106, is available, or all camera (e.g., 106, 116, 124, and/or 130) video feeds have the same missing area, the video processing-communication unit may complete missing whiteboard 102 areas from previously composed whiteboard video stream 150 frames that were captured in the past. If missing areas of the whiteboard 102 are available in video feeds from different camera angles (e.g., 106, 116, 124, and/or 130), then the video processing-communication unit 112 may merge or fuse (i.e., aggregate) different video feeds from different cameras (e.g., 106, 116, 124, and/or 130) to complete missing areas.

To compose the merged or fused images from different cameras (e.g., 106, 116, 124, and/or 130) into a single final conference whiteboard video stream 150, the video processing-communication unit 112 may align all video feeds according to the borders of the whiteboard 102 image in the video feeds. Once the whiteboard 102 image is aligned in the video feeds, the occluded and/or missing areas of the whiteboard of one feed may be merged or fused with the overlapping areas of other aligned video feeds to complete the occluded and/or missing areas.

The presenter 104 may optionally control the video processing-communication unit 112 using the control strip 140. The control strip 140 is not electronically enhanced, but may include areas that are visually discernable by at least one of the cameras (e.g., 106, 116, 124, and/or 130). The control strip 140 may be a board, plaque, sticker or other visual representation attached to, or next to, the whiteboard 102. The control strip may have defined areas (i.e., a row of non-interactive buttons or otherwise camera visually discernable areas) that represent different commands that the presenter 104 may desire to send to the video processing-communication unit 112. The video processing-communication unit 112 may monitor the presenter video stream 148 to detect presenter 104 interactions with the control strip 102. If the presenter 104 points to or touches a defined area of the control strip 140, the video processing-communication unit 112 may perform a pre-defined command associated with the touched/pointed to defined area. A video display 136 may also optionally be attached to, or next to, the whiteboard 102, or be placed near the presenter 104 so that the presenter 104 may monitor the presenter 148 and/or whiteboard 150 video streams to make sure the proper information is being communicated 114 to other video conference member devices. The video display 136 may also present video and/or computer program information from other video conference members so that the presenter 104 is able to interact with remote video conference members in addition to delivering the final conference presenter 148 and whiteboard 150 video streams to other video conference members. If video display 136 is a touch screen, or some other input device is provided, the video display 136 may also be used by the presenter to send commands to the video processing-communication unit 112 via the video display communication link 138. The video display communication link 138 may use typical wired and wireless computer communication technologies.

Accordingly, the various embodiments of a whiteboard video conference collaboration system may be built with relatively low cost components. The frontal white board camera 106 and/or the side cameras 124, 130 may be implemented using inexpensive, webcam grade camera equipment. The system may be executed with slow frame rate video feeds, particularly the whiteboard video stream 150 may be implemented with a very slow frame rate such as the 5 fps suggested above. The two, or more, final conference video streams 148, 150 generated by the video processing-communication system 112 to deliver 114 to other video conference member devices may be easily integrated with existing video conferencing equipment. The logic and processing necessary has a relatively low performance footprint and/or is executed on low frame rate video feeds. Consequently, the video processing-communication unit 112 processing may be performed on existing video conferencing computer equipment and/or on a low-end, low-cost personal computer (PC) or server.

Figure 2:
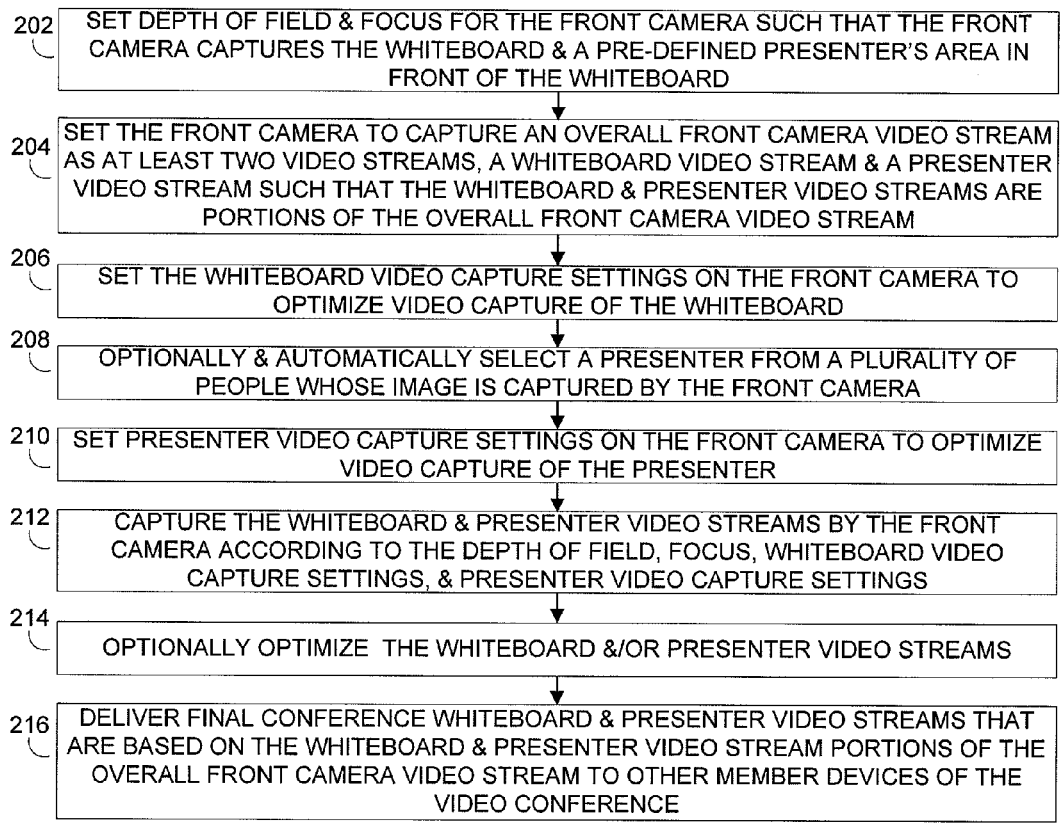
FIG. 2 is a flow chart of a process of preparing and delivering whiteboard and presenter video streams for an embodiment.

FIG. 2 is a flow chart 200 of a process of preparing and delivering whiteboard and presenter video streams for an embodiment. The processes of FIG. 2 may be performed by the video processing-communication unit/system of an embodiment. At process 202, the depth of field and focus of a front camera is set such that the front camera captures a whiteboard and a pre-defined "presenter's area" in front of the whiteboard. At process 204, the front camera is set to capture an overall front camera video stream as at least two video streams, a whiteboard video stream and a presenter video stream such that the whiteboard and presenter video streams are portions of the overall front camera video stream. At process 206, whiteboard video capture settings (e.g., exposure, white balance, etc.) on the front camera are set for the whiteboard video stream such that the video capture is optimized to capture video of the whiteboard. At process 208, the presenter may optionally, and automatically, be selected from a plurality of people whose image is captured by the front camera. At process 210, presenter video capture settings (e.g., exposure, white balance, etc.) on the front camera are set for the presenter video stream such that the video capture is optimized to capture video of the presenter. At process 212, the front camera captures whiteboard and presenter video streams according to the depth of field, focus, whiteboard video capture settings, and presenter video capture settings. At process 214, the whiteboard and/or presenter video streams are optimized to provide cleaner and/or more complete video images in the whiteboard and/or presenter video streams. At process 216, the final conference whiteboard and presenter video streams that are based on the whiteboard and presenter video stream portions of the overall front camera video stream are delivered to other member devices of the video conference.

Figure 3:
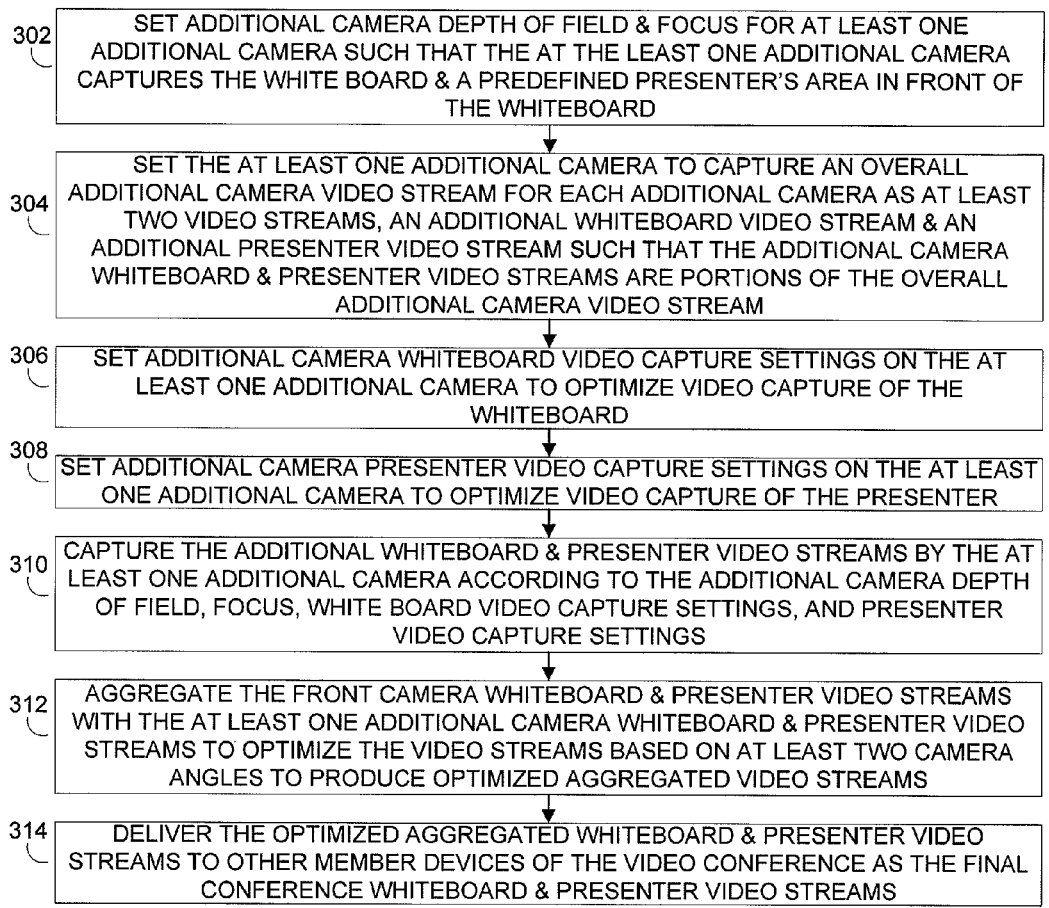
FIG. 3 is a flow chart of a process of preparing and delivering multi-camera optimized video streams for an embodiment.

FIG. 3 is a flow chart 300 of a process of preparing and delivering multi-camera optimized video streams for an embodiment. The processes of FIG. 3 may be performed by the video processing-communication unit/system of an embodiment in addition to the processes described in the disclosure with respect to FIG. 2 above. At process 302, the depth of field and focus of at least one additional camera is set such that the at least one additional camera captures the whiteboard and the pre-defined "presenter's area" in front of the whiteboard. At process 304, the at least one additional camera is set to capture an overall additional camera video stream as at least two video streams, an additional whiteboard video stream and an additional presenter video stream such that the additional camera whiteboard and presenter video streams are portions of the overall additional camera video stream. At process 306, additional camera whiteboard video capture settings (e.g., exposure, white balance, etc.) on the at least one additional camera are set for the additional whiteboard video stream such that the at least one additional camera video capture is optimized to capture video of the whiteboard. At process 308, additional presenter video capture settings (e.g., exposure, white balance, etc.) on the at least one additional camera are set for the additional presenter video stream such that the at least one additional camera video capture is optimized to capture video of the presenter. At process 310, the at least one additional camera captures additional whiteboard and presenter video streams according to the depth of field, focus, additional camera whiteboard video capture settings, and additional camera presenter video capture settings. At process 312, the additional whiteboard and/or presenter video streams are aggregated with the front camera whiteboard and presenter video streams to optimize the whiteboard and presenter video streams based on at least two camera angles to produce optimized aggregated video streams. At process 314, the optimized aggregated whiteboard and presenter video streams are delivered to other member devices of the video conference as the final conference whiteboard and presenter video streams.

Figure 4:
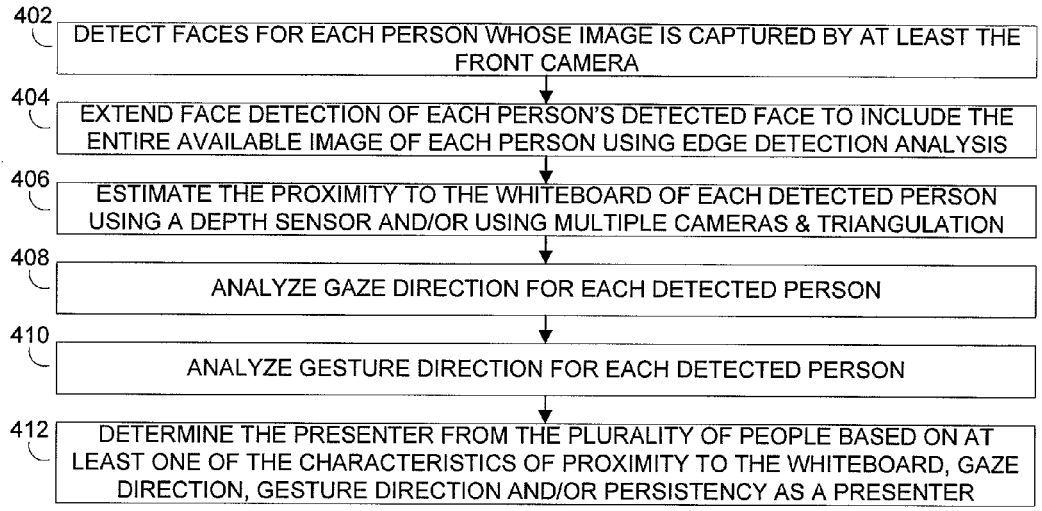
FIG. 4 is a flow chart of a process of selecting a presenter from a plurality of people for an embodiment.

FIG. 4 is a flow chart 400 of a process of selecting a presenter from a plurality of people for an embodiment. The processes of FIG. 4 may be performed by the video processing-communication unit/system of an embodiment as part of process 208 to automatically select a presenter described in the disclosure with respect to FIG. 2 above. At process 402, the face of each person whose image is captured by at least the front camera is detected. The face detection algorithm(s) will benefit from being run using the video feed from all available cameras since face detection algorithm(s) are typically limited in the flexibility of detecting a face at steep camera angles and the more available camera angles, the more likely it is to capture a face at shallower camera angles. If only the front camera is available (or it is desired to use only the front camera), the face detection algorithm(s) may be run with only the front camera feed, but the results may not be as good as when multiple camera feeds are utilized. At process 404, each person whose face was detected has the associated face detection extended to include the entire available image of the person using edge detection analysis. At process 406, the proximity (i.e., depth) of each detected person relative to the whiteboard is estimated using an optional depth sensor and/or using multiple cameras and triangulation. At process 408, the gaze direction of each detected person is analyzed. At process 410, the gesture direction of each detected person is analyzed. At process 412, the active presenter is selected from the plurality of people whose image is captured by the front camera based on at least one of the characteristics of proximity to the whiteboard (i.e., the closer to the whiteboard, the more likely to be the presenter), gaze direction (i.e., gazing at the audience instead of strictly at the whiteboard, the more likely to be the presenter), gesture direction (i.e., gesturing at the whiteboard, the more likely to be the presenter), and/or persistency as a presenter (i.e., if the person was previously the presenter, the more likely the person will remain the active presenter).

Figure 5:
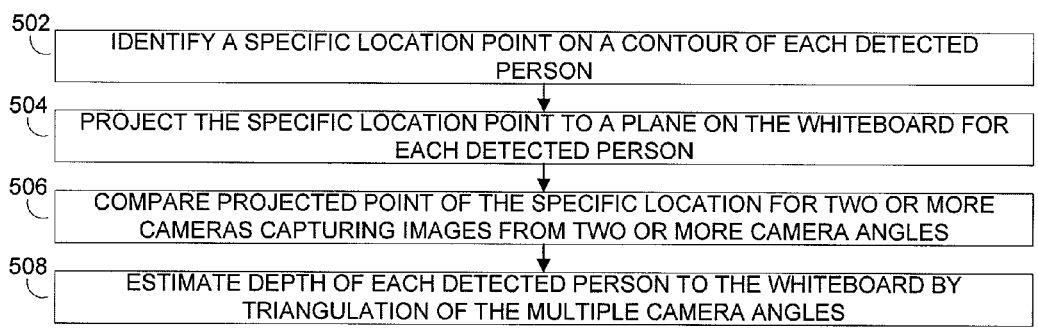
FIG. 5 is a flow chart of a process of estimating proximity of people to the whiteboard using multiple cameras for an embodiment.

FIG. 5 is a flow chart 500 of a process of estimating proximity of people to the whiteboard using multiple cameras for an embodiment. The processes of FIG. 5 may be performed by the video processing-communication unit/system of an embodiment as part of process 406 to estimate proximity of a person to the whiteboard described in the disclosure with respect to FIG. 4 above. At process 502, a specific location point on a contour (e.g., the highest point) of each detected person is identified. At process 504, the specific location point of each detected person is projected to a plane of the whiteboard. At process 506, the projected point of each detected person is compared for two or more cameras capturing images from two or more camera angles (e.g., the front camera and at least one side camera). At process 508, the estimated depth/proximity of each detected person relative to the whiteboard is calculated using triangulation of the multiple camera angles.

Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method to collaborate in a video conference when a presenter uses a non-electronically enhanced writing surface, referred to herein as a whiteboard, and without using electronically enhanced writing and/or pointing tools, using a front camera that is operatively connected to a video processing-communication unit and is placed in front of said whiteboard in order to capture video of said whiteboard and said presenter using said whiteboard, said video conference collaboration method comprising:

setting by said video processing-communication unit a depth of field and a focus for said front camera such that said front camera captures an image of said whiteboard and a predefined distance in front of said whiteboard as a presenter's area;

setting by said video processing-communication unit said front camera to capture an overall front camera video stream as at least two video streams, a whiteboard video stream and a presenter video stream such that said whiteboard video stream and said presenter video stream are portions of said overall front camera video stream;

setting by said video processing-communication unit whiteboard video capture settings of said whiteboard video stream on said front camera to optimize capture of said whiteboard;

setting by said video processing-communication unit presenter video capture settings of said presenter video stream on said front camera to optimize capture of said presenter in said presenter's area in front of said whiteboard;

capturing by said video processing-communication unit said whiteboard video stream and said presenter video stream using said front camera according to said depth of field, said focus, said whiteboard video capture settings, and said presenter video capture settings; and delivering by said video processing-communication unit a final conference whiteboard video stream based on said whiteboard video stream and a final conference presenter video stream based on said presenter video stream to member devices of said video conference.

2. The method of claim 1 wherein said process of capturing by said video processing-communication unit said whiteboard video stream and said presenter video stream of said presenter using said front camera further comprises designating a whiteboard video stream portion of said overall front camera video stream as said whiteboard video stream and a presenter video stream portion of said overall front camera video stream as said presenter video stream such that when said front camera is capturing said whiteboard video stream portion of said overall front camera video stream, said front camera operates according to said whiteboard video capture settings, and when said front camera is capturing said presenter video stream portion of said overall front camera video stream, said front camera operates according to said presenter video capture settings.

3. The method of claim 1 wherein at least one additional camera is operatively connected to said video processing-communication unit, said at least one additional camera is placed such that said at least one additional camera captures video of said whiteboard and said presenter from a different angle than said front camera, said method of claim 1 further comprising:

setting by said video processing-communication unit an additional camera depth of field and an additional camera focus for said at least additional camera such that said at least one additional camera captures an image of said whiteboard and said predefined distance in front of said whiteboard as said presenter's area;

setting by said video processing-communication unit said at least one additional camera to capture an overall additional camera video stream as at least two video streams, an additional camera whiteboard video stream and an additional camera presenter video stream such that said additional camera whiteboard video stream and said additional camera presenter video stream are portions of said overall additional camera video stream;

setting by said video processing-communication unit additional camera whiteboard video capture settings of said additional camera whiteboard video stream on said at least one additional camera to optimize capture of said whiteboard;

setting by said video processing-communication unit additional camera presenter video capture settings of said additional camera presenter video stream on said at least one additional camera to optimize capture of said presenter in said presenter's area in front of said whiteboard;

capturing by said video processing-communication unit said additional camera whiteboard video stream and said additional camera presenter video stream using said at least one additional camera according to said additional camera depth of field, said additional camera focus, said additional camera whiteboard video capture settings, and said additional camera presenter video capture settings;

aggregating by said video processing-communication unit said additional camera whiteboard video stream with said whiteboard video stream in order to optimize images presented based on at least two camera angles of said front camera and said at least one additional camera in order to produce an optimized whiteboard video stream;

aggregating by said video processing-communication unit said additional camera presenter video stream with said presenter video stream in order to optimize images presented based on at least two camera angles of said front camera and said at least one additional camera in order to produce an optimized presenter video stream; and wherein said process of delivering by said video processing-communication unit said whiteboard video stream and said presenter video stream to member devices of said video conference delivers said optimized whiteboard video stream as said final conference whiteboard video stream and said optimized presenter video stream as said final conference presenter video stream.

4. The method of claim 1 further comprising:

optimizing said whiteboard video stream by said video processing-communication unit prior to said process of delivering by said video processing-communication unit said whiteboard video stream and said presenter video stream as said final conference whiteboard video stream and said final conference presenter video stream to member devices of said video conference;

wherein said optimization is at least one of a group consisting of: image processing to transform captured images of said whiteboard to a rectangular shape, enhancing said captured images of said whiteboard to improve lines and shapes contrast, and balancing colors of said captured images of said whiteboard to obtain an authentic whiteboard color.

5. The method of claim 1 further comprising:

detecting by said video processing-communication unit that portions of said whiteboard in said whiteboard video stream are occluded; and replacing by said video processing-communication unit said detected occluded portions of said whiteboard in said whiteboard video stream with previously composed frames of said whiteboard video stream not having said detected occluded portions of said whiteboard in order to complete missing portions of said whiteboard in said whiteboard video stream.

6. The method of claim 3 further comprising:

detecting by said video processing-communication unit that portions of said whiteboard in said whiteboard video stream are occluded; and wherein said process of aggregating by said video processing-communication unit said additional camera whiteboard video stream with said whiteboard video stream in order to optimize images presented based on at least two camera angles of said front camera and said at least one side video camera in order to produce an optimized whiteboard video stream further comprises replacing by said video processing-communication unit said detected occluded portions of said whiteboard in said whiteboard video stream with frames of said additional camera whiteboard video stream that show said portions of said whiteboard detected as being occluded in order to complete missing portions of said whiteboard in said whiteboard video stream.

7. The method of claim 3 further comprising:

detecting by said video processing-communication unit that portions of said whiteboard in said whiteboard video stream are distorted by specular light and reflections; and wherein said process of aggregating by said video processing-communication unit said additional camera whiteboard video stream with said whiteboard video stream in order to optimize images presented based on at least two camera angles of said front camera and said at least one side video camera in order to produce an optimized whiteboard video stream further comprises replacing by said video processing-communication unit said detected specular light and reflections distorted portions of said whiteboard in said whiteboard video stream with frames of said additional camera whiteboard video stream that show said specular light and reflections distorted portions of said whiteboard without distortions in order to compensate for said y said detected specular light and reflections in said whiteboard video stream.

8. The method of claim 3 wherein said process of aggregating by said video processing-communication unit said additional camera whiteboard video stream with said whiteboard video stream in order to optimize images presented based on at least two camera angles of said front camera and said at least one side video camera in order to produce an optimized whiteboard video stream further comprises:

aligning said whiteboard video stream and said additional camera whiteboard stream according to borders of said whiteboard; and composing said optimized whiteboard video stream based on said alignment of said borders of said whiteboard between said whiteboard video stream and said additional camera whiteboard video stream.

9. The method of claim 1 further comprising:

automatically selecting by said video processing-communication unit said presenter from a plurality of people whose image is captured by at least said front camera; and wherein at least said process of setting by said video processing-communication unit presenter video capture settings of said presenter video stream on said front camera to optimize capture of said presenter in said presenter's area in front of said whiteboard optimizes for said automatically selected presenter.

10. The method of claim 9 wherein said process of automatically selecting by said video processing-communication unit said presenter from said plurality of people whose image is captured by at least said front camera further comprises:

detecting faces of each person of said plurality of people whose image is captured by at least said front camera using face detection analysis;

extending face detection of each person of said plurality of people whose image is captured by at least said front camera to include an entire available image of each person of said plurality of people using edge detection analysis;

estimating proximity to said whiteboard of each detected person of said plurality of people whose image is captured by at least said front camera;

analyzing gaze direction for each detected person of said plurality of people whose image is captured by at least said front camera;

analyzing gesture direction for each detected person of said plurality of people whose image is captured by at least said front camera; and determining a person of said plurality of people whose image is captured by at least said front camera is said presenter based on at least one of a group of characteristics for each person of said plurality of people consisting of: proximity to said whiteboard, gaze direction, gesture direction, and persistency as said presenter.

11. The method of claim 10 wherein said process of estimating proximity to said whiteboard of each detected person of said plurality of people whose image is captured by at least said front camera further comprises using a depth sensing camera to obtain said estimate of proximity to said whiteboard.

12. The method of claim 10 wherein said process of estimating proximity to said whiteboard of each detected person of said plurality of people whose image is captured by at least said front camera further comprises:

identifying a specific location point on a contour of each detected person of said plurality of people whose image is captured by at least said front camera;

projecting said specific location point to a plane on said whiteboard for each detected person of said plurality of people whose image is captured by at least said front camera;

comparing projected points of said specific location point for two or more cameras capturing images from two or more camera angles; and estimating a depth of each detected person of said plurality of people whose image is captured by at least said front camera by triangulation of said specific location point from said two or more cameras at two or more camera angles.

13. A whiteboard video conference collaboration system comprising:

a front camera placed in front of a non-electronically enhanced writing surface, referred to herein as a whiteboard, in order to capture video of said whiteboard and a presenter using said whiteboard;

a video processing-communication unit that is operatively connected to said front camera, that sets a depth of field and a focus for said front camera such that said front camera captures an image of said whiteboard and a predefined distance in front of said whiteboard as a presenter's area, that sets said front camera to capture an overall front camera video stream as at least two video streams, a whiteboard video stream and a presenter video stream, such that said whiteboard video stream and said presenter video stream are portions of said overall front camera video stream, that sets whiteboard video capture settings of said whiteboard video stream on said front camera to optimize capture of said whiteboard, that sets presenter video capture settings of said presenter video stream on said front camera to optimize capture of said presenter in said presenter's area in front of said whiteboard, that captures said whiteboard video stream and said presenter video stream using said front camera according to said depth of field, said focus, said whiteboard video capture settings, and said presenter video capture settings, and delivers a final conference whiteboard video stream based on said whiteboard video stream and a final conference presenter video stream based on said presenter video stream to member devices of said video conference.

14. The whiteboard video conference collaboration system of claim 13 wherein said video processing-communication unit further designates a whiteboard video stream portion of said overall front camera video stream as said whiteboard video stream and a presenter video stream portion of said overall front camera video stream as said presenter video stream such that when said front camera is capturing said whiteboard video stream portion of said overall front camera video stream, said front camera operates according to said whiteboard video capture settings, and when said front camera is capturing said presenter video stream portion of said overall front camera video stream, said front camera operates according to said presenter video capture settings.

15. The whiteboard video conference collaboration system of claim 13 further comprising:

at least one additional camera is operatively connected to said video processing-communication unit, said at least one additional camera being placed such that said at least one additional camera captures video of said whiteboard and said presenter from a different angle than said front camera; and wherein said video processing-communication unit further sets an additional camera depth of field and an additional camera focus for said at least additional camera such that said at least one additional camera captures an image of said whiteboard and said predefined distance in front of said whiteboard as said presenter's area, sets said at least one additional camera to capture an overall additional camera video stream as at least two video streams such that said additional camera whiteboard video stream and said additional camera presenter video stream are portions of said overall additional camera video stream, an additional camera whiteboard video stream and an additional camera presenter video stream, sets additional camera whiteboard video capture settings of said additional camera whiteboard video stream on said at least one additional camera to optimize capture of said whiteboard, sets additional camera presenter video capture settings of said additional camera presenter video stream on said at least one additional camera to optimize capture of said presenter in said presenter's area in front of said whiteboard, captures said additional camera whiteboard video stream and said additional camera presenter video stream using said at least one additional camera according to said additional camera depth of field, said additional camera focus, said additional camera whiteboard video capture settings, and said additional camera presenter video capture settings, aggregates said additional camera whiteboard video stream with said whiteboard video stream in order to optimize images presented based on at least two camera angles of said front camera and said at least one additional camera in order to produce an optimized whiteboard video stream, aggregates said additional camera presenter video stream with said presenter video stream in order to optimize images presented based on at least two camera angles of said front camera and said at least one additional camera in order to produce an optimized presenter video stream, and delivers said optimized whiteboard video stream as said final conference whiteboard video stream and said optimized presenter video stream as said final conference presenter video stream.

16. The whiteboard video conference collaboration system of claim 13 wherein said video processing-communication unit further optimizes said whiteboard video stream prior to delivery of said whiteboard video stream and said presenter video stream as said final conference whiteboard video stream and said final conference presenter video stream to member devices of said video conference such that said optimization is at least one of a group consisting of: image processing to transform captured images of said whiteboard to a rectangular shape, enhancing said captured images of said whiteboard to improve lines and shapes contrast, and balancing colors of said captured images of said whiteboard to obtain an authentic whiteboard color.

17. The whiteboard video conference collaboration system of claim 13 wherein said video processing-communication unit further detects that portions of said whiteboard in said whiteboard video stream are occluded, and replaces said detected occluded portions of said whiteboard in said whiteboard video stream with previously composed frames of said whiteboard video stream not having said detected occluded portions of said whiteboard in order to complete missing portions of said whiteboard in said whiteboard video stream.

18. The whiteboard video conference collaboration system of claim 15 wherein said video processing-communication unit further detects that portions of said whiteboard in said whiteboard video stream are occluded, and said aggregation of said additional camera whiteboard video stream with said whiteboard video stream in order to optimize images presented based on at least two camera angles of said front camera and said at least one side video camera in order to produce an optimized whiteboard video stream further replaces said detected occluded portions of said whiteboard in said whiteboard video stream with frames of said additional camera whiteboard video stream that show said portions of said whiteboard detected as being occluded in order to complete missing portions of said whiteboard in said whiteboard video stream.

19. The whiteboard video conference collaboration system of claim 15 wherein said video processing-communication unit further detects that portions of said whiteboard in said whiteboard video stream are distorted by specular light and reflections, and said aggregation of said additional camera whiteboard video stream with said whiteboard video stream in order to optimize images presented based on at least two camera angles of said front camera and said at least one side video camera in order to produce an optimized whiteboard video stream further replaces said detected specular light and reflections distorted portions of said whiteboard in said whiteboard video stream with frames of said additional camera whiteboard video stream that show said specular light and reflections distorted portions of said whiteboard without distortions in order to compensate for said y said detected specular light and reflections in said whiteboard video stream.

20. The whiteboard video conference collaboration system of claim 13 wherein said video processing-communication unit further automatically selects said presenter from a plurality of people whose image is captured by at least said front camera, and said presenter video capture settings of said presenter video stream on at least said front camera to optimize capture of said presenter in said presenter's area in front of said whiteboard is optimized for said automatically selected presenter.

* * * * *